United States Patent Office 3,763,144
Patented Oct. 2, 1973

3,763,144
3-SUBSTITUTED BENZODIAZEPINE DERIVATIVES AND THEIR PREPARATION
Joseph Hellerbach, Basel, and Armin Walser, Arlesheim, Switzerland, assignors to Hoffmann-La Roche Inc., Nutley, N.J.
No Drawing. Filed July 16, 1968, Ser. No. 747,773
Claims priority, application Switzerland, Aug. 9, 1967, 11,227/67
Int. Cl. C07d 33/06
U.S. Cl. 260—239.3 D                    5 Claims

ABSTRACT OF THE DISCLOSURE 1,4-benzodiazepines having an oxygen functionality at the 3-position are converted into corresponding 1,4-benzodiazepines having two oxygen containing groups at the 3-position by oxidizing the former compounds with air or oxygen in the presence of a base. The 3-dioxygenated compounds are useful as anticonvulsants, muscle relaxants, tranquilizers, and sedatives.

SUMMARY OF THE INVENTION

The invention is concerned with processes for the preparation of benzodiazepine derivates of the formula:

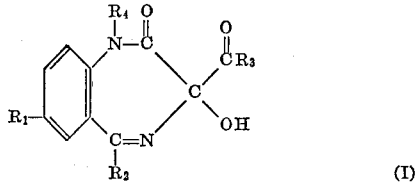

(I)

wherein $R_1$ is hydrogen, halogen, trifluoromethyl, nitro or amino, $R_2$ is alkyl, alkenyl, cycloalkyl, cycloalkenyl, pyridyl, phenyl or phenyl substituted with halogen, $R_3$ is alkoxy, benzyloxy, phenyloxy, amino, dialkylamino, or alkylthio, and $R_4$ is hydrogen, alkyl, cycloalkyl, cycloalkyl-alkyl, alkenyl, alkynyl, monoalkyl-aminoalkyl, or dialkylamino-alkyl, and the pharmaceutically acceptable acid addition salts of those members of the above compounds having basic character.

Compounds of Formula I are basic in character, particularly when they contain a basic side-chain substituted on the ring, such as for example, when $R_1$ is amino or $R_4$ is substituted amino-alkyl. Such basic compounds of Formula I form acid addition salts with organic and inorganic acids such as hydrochloric acid, hydrobromic acid, nitric acid, sulfuric acid, tartaric acid, citric acid, maleic acid, and the like by use of procedures now well established in the art.

The present invention further relates to the saponification of the above compounds of Formula I whereby the corresponding carboxylic acid alkali, alkaline earth or trialkylammonium salts are formed. Corresponding ammonium, alkylammonium, and dialkylammonium salts are obtained from the aforementioned salts by base exchange. These carboxylic acid salts correspond to the following formula:

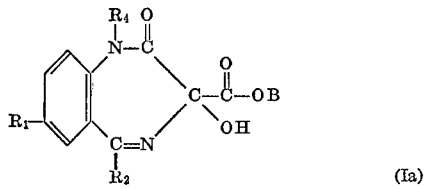

(Ia)

wherein $R_1$, $R_2$ and $R_4$ are as above and B is an alkali, alkaline earth, ammonium, alkylammonium, dialkylammonium or trialkylammonium cation.

The expression "alkyl" (alone or in combinations such as "alkoxy") as used in this specification relates to straight-chain or branched-chain saturated hydrocarbon groups with from 1–7, preferably from 1–4, carbon atoms. Examples of "alkyl" groups include methyl, ethyl, isopropyl, and the like. The expressions "alkenyl" and "alkynyl" relate in a similar manner to straight-chain or branched-chain unsaturated hydrocarbon groups having from 1–7, preferably from 1–4 carbon atoms. Suitable examples include allyl, methallyl, propargyl, and the like. The expression "halogen" includes all four halogens, i.e., fluorine, chlorine, bromine and iodine. The expression "cycloalkyl" denotes groups such as cyclopropyl, cyclobutyl, cyclopentyl and cyclohexyl.

The process of the present invention is characterized in that a compound of the formula:

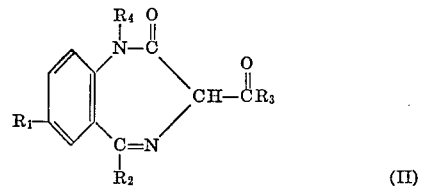

(II)

wherein $R_1$, $R_2$, $R_3$, and $R_4$ are as above, is treated with air or oxygen in the presence of a base to yield a compound of the Formula I above.

The oxidative process described above is conveniently conducted in an inert organic solvent such as ethers (e.g., tetrahydrofuran, dioxan), alcohols (e.g., lower alkanols such as ethanol) or mixtures thereof. While reaction conditions of temperature and pressure are not critical, it is most convenient to conduct the instant process at a temperature in the range between about −20° C. and room temperature and at atmospheric or elevated pressure. Bases which may be used in the practice of the subject oxidation process include, for example, alkali alkoxides such as sodium methoxide, alkali hydrides, alkali amides and alkali hydroxides, such as sodium hydroxide. It should, however, be pointed out that the use of an alkali hydroxide in the oxidation process can result in the simultaneous saponification and formation of a 3-carboxylic acid salt.

A preferred embodiment of the present process involves the preparation of compounds of Formula I wherein $R_1$ is halogen, $R_2$ is phenyl, phenyl substituted with halogen or pyridine, $R_3$ is alkoxy and $R_4$ is hydrogen or alkyl. When $R_2$ is phenyl substituted with halogen, the substituent is preferably situated in the o-position of the phenyl ring.

In a more preferred embodiment of the present process, compounds of Formula I wherein $R_1$ is chlorine, $R_2$ is phenyl, $R_3$ is alkoxy and $R_4$ is hydrogen or alkyl are obtained. A most preferred embodiment involves preparation of compounds of Formula I wherein $R_1$ is chlorine, $R_2$ is phenyl, $R_3$ is ethoxy and $R_4$ is hydrogen or methyl.

Compounds of Formula I wherein $R_4$ is an alkyl, mono- or dialkylaminoalkyl, alkenyl or alkynyl group may also be conveniently prepared from corresponding compounds of Formula I wherein $R_4$ is hydrogen by treating the aforesaid Formula I compound with an alkylating, alkenylating or alkynylating agent as the case may be. The desired alkylation, alkenylation or alkynylation can be readily accomplished by treating the $R_4$= hydrogen Formula I compound with either an alkali amide (e.g., lithium amide), an alkali hydride (e.g., sodium hydride) or an alkali alcoholate (e.g., sodium methoxide) in the presence of an inert organic solvent such as toluene, dimethylformamide and the like and subsequent treatment of the alkali derivative with the appropriate alkylating, alkenylating, or alkynylating agent.

Suitable alkylating agents include, for example, dialkyl sulfates such as dimethyl sulfate, alkyl halides such as methyl iodide, arylsulfonyl derivatives such as tosyl esters, alkylsulfonyl derivatives such as mesyl esters or diazoalkanes such as diazomethane; suitable alkenylating agents include, for example, alkenyl halides such as allyl bromide and the like. Suitable alkynylating agents include, for example, alkynyl halides such as propargyl bromide.

Compounds of Formula I wherein $R_1$ is nitro may also be conveniently prepared by nitration of corresponding compounds of Formula I wherein $R_1$ is hydrogen utilizing methods well known in the art (e.g., with nitric acid-sulfuric acid or sulfuric acid and potassium nitrate).

3-carboxylic acid esters or 3-carboxylic acid amides of Formula I can be saponified to the corresponding 3-carboxylic acid salts according to known methods; for example, by treatment with alkali hydroxides such as sodium hydroxide, alkaline earth hydroxides or tertiary organic bases. Corresponding ammonium, monoalkylammonium or dialkylammonium salts may be prepared by salt-exchange. The preparation of such salts is conveniently effected in a solvent in which the resulting salt is insoluble and precipitates. Preferred salts of the present invention include the alkali salts, most preferably the sodium salts of the saponified products obtained from compounds of Formula I.

The above 3-carboxylic acid salts, in a further aspect of the present invention, can be decarboxylated. The decarboxylation takes place slowly on standing, more quickly on heating and, in part, spontaneously on acidification.

Such decarboxylated compounds can also be obtained directly, i.e., without isolation of the 3-carboxylic acid ester or 3-carboxylic acid amide of Formula I from corresponding compounds of general Formula II.

The compounds of Formula I and their pharmaceutically acceptable addition salts possess pharmacological activity and are useful as anticonvulsants, muscle relaxants, tranquilizers and sedatives. The compounds of Formula I can be used as medicaments, for example, in the form of pharmaceutical preparations which contain them or their salts in admixture with a pharmaceutical, organic or inorganic inert carrier material suited for enteral or parenteral application, such as, for example, water, gelatin, gum arabic, lactose, starch, magnesium stearate, talc, vegetable oils, polyalkyleneglycols, and the like. The pharmaceutical preparations can be in solid form, for example, as tablets, dragees, suppositories, capsules or in liquid form, for example, as solutions, suspensions or emulsions. They may be sterilized and may contain additives, such as preserving, stabilizing, wetting or emulsifying agents and/or salts for varying the osmotic pressure or buffers. They may also contain other therapeutically valuable substances.

Suitable oral dosage regimens of compounds of Formula I, an equivalent amount of a pharmaceutically acceptable salt thereof or a compound of Formula Ia in warm blooded mammals comprise from about 0.1 mg./kg. per day to about 10.0 mg./kg. per day. However, for any particular subject, the specific dosage regimen should be adjusted according to individual need and the professional judgment of the person administering or supervising the administration of such compounds. It is to be understood that the dosages set forth herein are exemplary only and that they do not, to any extent, limit the scope or practice of this invention.

The anticonvulsive activity of the compounds of Formula I, the acid addition salts of such compounds or compounds of Formula Ia in mice using the pentamethylene tetrazole test. For example, the sodium salt of 7-chloro-2,3-dihydro-1-methyl-3-hydroxy-2-oxo - 5 - phenyl-1H - 1,4 - benzodiazepine - 3 - carboxylic acid has a $LD_{50} > 5,000$ (p.o.), whereas when given in oral dosages to mice this compound has a $ED_{50}$ of 3 mg./kg. in the aforesaid test. In contrast thereto, phenobarbital, an established anticonvlusive and sedative, exhibits a $ED_{50}$ of 70 mg./kg.

The muscle relaxant activity may be demonostrated in the rotating rod test. For example, the aforesaid sodium salt of 7-chloro-2,3-dihydro-1-methyl-3-hydroxy - 2 - oxo-5 - phenyl-1H-1,4-benzodiazepine-3-carboxylic acid given in oral dosages to mice in the above test exhibits a $HD_{50}$ of 8 mg./kg.

The following non-limiting examples further illustrate the invention. All temperatures are in degrees centigrade unless otherwise indicated.

Example 1

A solution of 9 g. of 7-chloro-2,3-dihydro-1-methyl-2-oxo-5-phenyl-1H-1,4-benzodiazepine - 3 - carboxylic acid ethyl ester in 50 ml. of absolute tetrahydrofuran was added to a solution of 0.5 g. of sodium in 50 ml. of absolute alcohol. A dry, $CO_2$-free stream of air was passed through the yellow reaction mixture for 4 hours with vigorous stirring. The solution, which became lighter, was treated with 15 ml. of 2 N acetic acid, concentrated by means of a rotary evaporator and the residue taken up in water and methylene chloride. The methylene chloride phase was washed with water, dried over magnesium sulfate and evaporated. 7-chloro-2,3-dihydro - 3 - hydroxy-1-methyl - 2 - oxo-5-phenyl-1H-1,4-benzodiazepine - 3 - carboxylic acid ethyl ester of melting point 170–172° crystallized from the residue. A product of melting point 174–176° was obtained after recrystallization from alcohol/ether.

Example 2

A solution of 6.85 g. of 7-chloro-2,3-dihydro-2-oxo-5-phenyl-1H-1,4-benzodiazepine - 3 - carboxylic acid ethyl ester in 75 ml. of absolute tetrahydrofuran was mixed with a solution of 1 g. of sodium in 50 ml. of absolute alcohol. A dry, $CO_2$-free stream of air was passed through the strongly stirred solution for 12 hours. After addition of 40 ml. of 2 N acetic acid, the mixture was concentrated by means of a rotary evaporator and the residue taken up in water and methylene chloride. The methylene chloride phase, after being washed with water and bicarbonate solution and then dried over magnesium sulfate, was evaporated in vacuo. The residue was taken up in ether from which crystalline material separated. After chromatography of the aforesaid crystalline material on 200 g. of Kieselgel using as solvent system a methylene chloride/ethyl acetate mixture (2:1), there was obtained 7-chloro-2,3-dihydro-3-hydroxy - 2 - oxo-5-phenyl-1H-1,4-benzodiazepine - 3 - carboxylic acid ethyl ester of melting point 190–193°.

Example 3

9.3 g. of 7 - chloro-2,3-dihydro-1-methyl-3-hydroxy-2-oxo-5-phenyl-1H-1,4-benzodiazepine - 3 - carboxylic acid ethyl ester were stirred in a mixture of 90 ml. of dioxan, 75 ml. of water and 13.75 ml. of 2 N caustic soda at 25° for 24 hours. The solution was buffered to pH 7–8 by addition of 2 N acetic acid and extracted three times with 200 ml. of ether in order to separate off dioxan and unsaponified material. The filtered aqueous phase was concentrated to 30 g. at 20–30° by means of a rotary evaporator and the concentrate treated with acetone up to incipient crystallization. After cooling to $-5°$, the crystals were filtered off by suction, washed with a small amount of cold acetone-water mixture and acetone and dried at 25° (12 mm. Hg). After recrystallization from water-acetone and drying for 2 hours at 25° (0.02 mm. Hg) there was obtained the sodium salt of 7-chloro-2,3-dihydro-1-methyl-3-hydroxy-2-oxo - 5 - phenyl - 1H - 1,4 - benzodiazepine-3-carboxylic acid of melting point 220–225° dec.

Example 4

10.8 g. of 7-chloro-2,3-dihydro-3-hydroxy - 2 - oxo-5-phenyl-1H-1,4-benzodiazepine - 3 - carboxylic acid ethyl ester were stirred in a mixture of 150 ml. of dioxan, 100 ml. of water and 16.5 ml. of 2 N caustic soda at 25° for 120 hours. The reaction medium was buffered to pH 7–8 by addition of 2 N acetic acid and extracted twice with 200 ml. of ether each time and three times with 100 ml. of methylene chloride each time. The filtered aqueous phase was concentrated in vacuo at 25 to 30°, whereupon the sodium salt of 7-chloro-2,3-dihydro-3-hydroxy-2-oxo-5-phenyl-1H-1,4-benzodiazepine-3-carboxylic acid began to crystallize out. After cooling to 0°, the salt was filtered off by suction, washed with a small amount of cold water-methanol mixture, dried in vacuo (12 mm. Hg), recrystallized from water and dried again in vacuo (0.02 mm. Hg) at 25° for twelve hours.

Example 5

1.8 g. of 7-chloro-2,3-dihydro-3-hydroxy-2-oxo-5-phenyl-1H-1,4-benzodiazepine-3-carboxylic acid ethyl ester suspended in 50 ml. of alcohol was treated with 4 ml. of 50 percent caustic potash. The suspended material then went into solution. After 48 hours, the dipotassium salt of 7-chloro-2,3-dihydro-3-hydroxy-2-oxo-5-phenyl - 1H - 1,4-benzodiazepine-3-carboxylic acid which had crystallized out was filtered off by suction and washed with alcohol. This dipotassium salt was dissolved in 30 ml. of water and titrated with 4 ml. of 2 N hydrochloric acid. At pH 7–8 the mono-potassium salt precipitated, on further acidification a mixture of free acid and 7-chloro-2,3-dihydro-3-hydroxy-2-oxo-5-phenyl-1H-1,4 - benzodiazepine was obtained. For complete decarboxylation it was necessary to stir the suspension at 25° for a further 6 hours. The crystalline material was filtered off by suction and recrystallized from alcohol. There was obtained 7-chloro-2,3-dihydro-3-hydroxy-2-oxo-5-phenyl - 1H - 1,4 - benzodiazepine of melting point 205–210°.

Example 6

25 mg. of sodium 7-chloro-2,3-dihydro-1-methyl-3-hydroxy-2-oxo-5-phenyl-1H-1,4-benzodiazepin-3-carboxylate was mixed with 158 mg. lactose and 37 mg. corn starch in a mixture. The mixture was run through a comminuter and the mixed powder returned to the mixer where 5 mg. of talc was mixed therewith and the composition was then filled into hard gelatin capsules.

Example 7

A mixture containing 1.80 g. of sodium 7-chloro-2,3-dihydro-1-methyl-3-hydroxy-2-oxo-5 - phenyl - 1H - 1,4-benzodiazepin-3-carboxylate, 81.7 g. propylene glycol monostearate, 1,5 g. beeswax, 8.00 g. Vaseline, 2.0 g. "Twen 80" and 5.0 g. polyethylene stearate was stirred with heating until homogenized. The resulting mixture was cooled to 45–50° and filled in suppository forms. Each suppository contained 25 mg. of the active substance.

Example 8

20 mg. of sodium 7-chloro-2,3-dihydro-1-methyl-3-hydroxy-2-oxo-5-phenyl-1H-1,4-benzodiazepin-3-carboxylate was mixed with 133 mg. of corn starch and 300 mg. of lactose. The mixture was moistened with 12 mg. of gelatin (10 percent solution) and the solid was broken up into 6 mm. coarse particles. These granules were dried at 43°, comminuted to a suitable fineness (1 mm.) and then were mixed with 10 mg. talc, 15 mg. corn starch, and 10 mg. magnesium stearate. The resulting product was pressed into tablets of 50 mg. Each tablet contained 2 mg. of active substance.

Example 9

25 mg. of the sodium salt of 7-chloro-2,3-dihydro-1-methyl-3-hydroxy-2-oxo-5-phenyl-1H-1,4 - benzodiazepin-3-carboxylic acid and 5 ml. of water for injection were filled in double ampuls, wherein the active compound is in one ampul and the other contains the water necessary for making the solution. The ampuls were sealed and sterilized two hours at 124°.

What is claimed is:

1. A process for the preparation of a compound of the formula

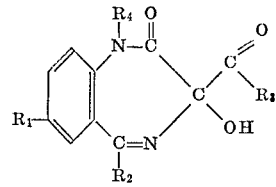

wherein $R_1$ is hydrogen, halogen, trifluoromethyl, nitro or amino, $R_2$ is lower alkyl, lower alkenyl, cycloalkyl containing from 3–6 carbon atoms, cycloalkenyl containing from 3–6 carbon atoms, pyridyl, phenyl or phenyl substituted with halogen, $R_3$ is lower alkoxy, benzyloxy, phenyloxy, amino, di-lower alkylamino, or lower alkylthio, and $R_4$ is hydrogen, lower alkyl, cycloalkyl containing from 3–6 carbon atoms, cycloalkyl-lower alkyl, wherein the cycloalkyl ring contains 3 to 6 carbon atoms, lower alkenyl, lower alkynyl, mono-lower alkylamino-lower alkyl, di-lower alkylamino-lower alkyl, which process comprises oxidizing a compound of the formula

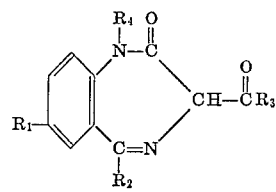

wherein $R_1$, $R_2$, $R_3$ and $R_4$ are as above, with an oxidizing agent selected from the group consisting of air and oxygen in the presence of a base.

2. The process of claim 1 wherein $R_1$ is halogen.

3. The process of claim 2 wherein $R_1$ is chlorine, $R_2$ is phenyl, $R_3$ is lower alkoxy and $R_4$ is hydrogen.

4. The process of claim 2 wherein $R_1$ is chlorine, $R_2$ is phenyl, $R_3$ is lower alkoxy and $R_4$ is lower alkyl.

5. The process of claim 2 wherein $R_2$ is phenyl substituted with halogen.

References Cited

UNITED STATES PATENTS

| 3,371,085 | 2/1968 | Reeder et al. | 260—239.3 D |
| 3,299,053 | 1/1967 | Archer et al. | 260—239.3 D |

FOREIGN PATENTS

| 4,206 | 6/1966 | France | 260—239.3 |

OTHER REFERENCES

Bell et al.: "J. Med. Pharm. Chem.," vol. 11, pp. 457–461, May 1968.

Bell et al.: "J. Med. Chem.," vol. 11, No. 3, pp. 457–461 (1968).

HENRY R. JILES, Primary Examiner

R. T. BOND, Assistant Examiner

U.S. Cl. X.R.

424—244, 263